(12) United States Patent
Qian et al.

(10) Patent No.: US 11,157,348 B1
(45) Date of Patent: Oct. 26, 2021

(54) COGNITIVE CONTROL OF RUNTIME RESOURCE MONITORING SCOPE

(71) Applicant: INTERNATIONAL BUSINESS MACHINES CORPORATION, Armonk, NY (US)

(72) Inventors: Bing Qian, Beijing (CN); Yi Xin Song, Beijing (CN); Bo Chen Zhu, Xi'an (CN); Tian Ming Pan, Beijing (CN); Peng Fei Tian, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/862,616

(22) Filed: Apr. 30, 2020

(51) Int. Cl.
*G06F 11/07* (2006.01)

(52) U.S. Cl.
CPC ........ *G06F 11/079* (2013.01); *G06F 11/0706* (2013.01); *G06F 11/0769* (2013.01)

(58) Field of Classification Search
CPC ... G06F 11/0706; G06F 11/076; G06F 11/079
See application file for complete search history.

(56) References Cited

U.S. PATENT DOCUMENTS

| | | | |
|---|---|---|---|
| 10,061,632 B2* | 8/2018 | Ben Simhon | H04L 43/16 |
| 10,146,609 B1* | 12/2018 | Leverich | G06F 11/079 |
| 2006/0064486 A1 | 3/2006 | Baron et al. | |
| 2008/0301700 A1 | 12/2008 | Junkins et al. | |
| 2013/0226348 A1 | 8/2013 | Zheng | |
| 2018/0173583 A1* | 6/2018 | Braundmeier | G06F 11/0781 |

FOREIGN PATENT DOCUMENTS

WO  WO-2011094312 A1 *  8/2011  ......... H04L 63/1425

OTHER PUBLICATIONS

Le-Quoc, Alexis "Monitoring 101: Investigbating performance issues", retrieved at: https://www.datadoghq.com/blog/monitoring-101-investigation/; Published Jul. 16, 2015; 6 pgs.
Reynolds, Justin "The top 19 APM tools in 2019", Raygun Blog retrieved at: https://raygun.com/blog/apm-tools/; Posted Sep. 19, 2018; 17 pgs.
Stern, Ben "Cognitive analytics to predict and isolate APM problems", Cloud Computing News; retrieved at: https://www.ibm.com/blogs/cloud-computing/2016/04/05/cognitive-analytics-predict-isolate-apm-problems/; dated Apr. 5, 2016; 10 pgs.

* cited by examiner

*Primary Examiner* — Joseph R Kudirka
(74) *Attorney, Agent, or Firm* — Cantor Colburn LLP; Teddi Maranzano

(57) ABSTRACT

Embodiments include cognitive control of runtime resource monitoring scope. Aspects include obtaining historical data for each of a plurality of metrics for a computer system and calculating, based on the historical data, an anomaly relationship score for each of the plurality of metrics. Aspects also include calculating, based on the historical data, a sensitivity score for each of the plurality of metrics and determining a priority score for each of the plurality of metrics based upon a weighted combination of the anomaly relationship score and the priority score. Aspects further include receiving real-time data for each of the plurality of metrics and presenting a subset of the real-time data to a user, the subset created by selecting one or more of the plurality of metrics based on the priority score of each of the plurality of metrics.

20 Claims, 6 Drawing Sheets

COGNITIVE CONTROL OF RUNTIME RESOURCE MONITORING SCOPE

BACKGROUND

The present invention relates to application performance management (APM), and particularly to cognitive control of runtime resource monitoring scope in an APM environment.

Operating systems (e.g. z/OS) provide controls to share finite hardware resources amongst client services. A workload consists of one or more jobs performing computing for similar client services. When multiple workloads are executing in parallel on the same operating system, a component (e.g. Workload Manager (WLM) on z/OS) provides controls to define attributes for each workload such as an importance level and a goal (e.g. response time). At regular intervals (e.g. every 10 s), this component assesses the results of each workload and may change the scheduler priority attribute of each workload so most important workloads achieve their goals. Work represents the aggregate computing performed across all workloads.

For systems serving multiple (e.g. double digits) workloads, transient performance problem diagnosis requires identifying problematic workload(s), defining root cause, and recommending corrective action. A performance analyst uses visual analytics to graphically visualize activity in the form of metrics (e.g. central processing unit (CPU) execution time, CPU efficiency, CPU delay, serialization contention, etc.) against time or transaction rate for all work to define normal and anomalous activity. Detailed visual analytics against each workload can be overwhelming to an analyst and require significant computing resources.

SUMMARY

According to one or more embodiments, a computer-implemented method for the cognitive control of runtime resource monitoring scope is provided. The method includes obtaining historical data for each of a plurality of metrics for a computer system and calculating, based on the historical data, an anomaly relationship score for each of the plurality of metrics. The method also includes calculating, based on the historical data, a sensitivity score for each of the plurality of metrics and determining a priority score for each of the plurality of metrics based upon a weighted combination of the anomaly relationship score and the sensitivity score. The method further includes receiving real-time data for each of the plurality of metrics and presenting a subset of the real-time data to a user, the subset created by selecting one or more of the plurality of metrics based on the priority score of each of the plurality of metrics.

According to one or more embodiments, a computer program product includes a memory device with computer executable instructions therein, the instructions when executed by a processing unit perform a method of cognitive control of runtime resource monitoring scope. The method includes obtaining historical data for each of a plurality of metrics for a computer system and calculating, based on the historical data, an anomaly relationship score for each of the plurality of metrics. The method also includes calculating, based on the historical data, a sensitivity score for each of the plurality of metrics and determining a priority score for each of the plurality of metrics based upon a weighted combination of the anomaly relationship score and the sensitivity score. The method further includes receiving real-time data for each of the plurality of metrics and presenting a subset of the real-time data to a user, the subset created by selecting one or more of the plurality of metrics based on the priority score of each of the plurality of metrics.

According to one or more embodiments, a system includes a memory, and a processor coupled to the memory, the processor performs a method of cognitive control of runtime resource monitoring scope. The method includes obtaining historical data for each of a plurality of metrics for a computer system and calculating, based on the historical data, an anomaly relationship score for each of the plurality of metrics. The method also includes calculating, based on the historical data, a sensitivity score for each of the plurality of metrics and determining a priority score for each of the plurality of metrics based upon a weighted combination of the anomaly relationship score and the sensitivity score. The method further includes receiving real-time data for each of the plurality of metrics and presenting a subset of the real-time data to a user, the subset created by selecting one or more of the plurality of metrics based on the priority score of each of the plurality of metrics.

DETAILED DESCRIPTION

Assessing the performance of computing systems can be an important part of the testing and monitoring day-to-day operation of computing systems. Traditionally such assessments are accomplished through performance instrumentation that includes performance metrics. In general, a computer server ("server") makes finite hardware resources available to multiple applications. The server consists of many stack layers (e.g. middleware, operating system, hypervisor, and hardware). Every stack layer contains components (single to double digits) that manage resources (single digits to thousands) that are virtualized to the applications, and consequently to the users of those applications.

Current application performance management products include two main types of monitor monitoring, transaction monitoring which focuses on the information collection of transaction status and statistics and resource monitoring which focuses on the information collection of the resource usage status and statistics of system or each transaction. For resource monitoring, the more information collected, the more useful result from the analysis was generated. In this case, the resource monitor agent will collect as many indicators as possible to help it better analyze the system health. However, along with the more indicators collected, there will be more system cost on it. In the peak time, it is not feasible to monitor the performance data from every indicator. As a result, the user must determine which indicators to monitor and collect in order to balance the system cost between business transaction and system monitoring.

Embodiments of the present invention are directed to methods, system and computer program products for cognitive control of runtime resource monitoring scope. In exemplary embodiments, historical data is used to analyze the relationships among the indicators and the sensitivity of the indicators to the transaction rate of the computer system. The relationships among the indicators are often used to investigate the cause of anomalies and the sensitivity of the indicators are often used to predict the occurrence of an abnormal condition. In exemplary embodiments, a user provides weights that are applied to the relational analysis and the sensitivity analysis to identify the user's preference between predicting the occurrence of an abnormal condition and investigating the cause of anomalies. Based at least in part on the user provided weights, the scope of the indicators that are monitored are adjusted to balance the monitor effect and system cost.

Figure 1:
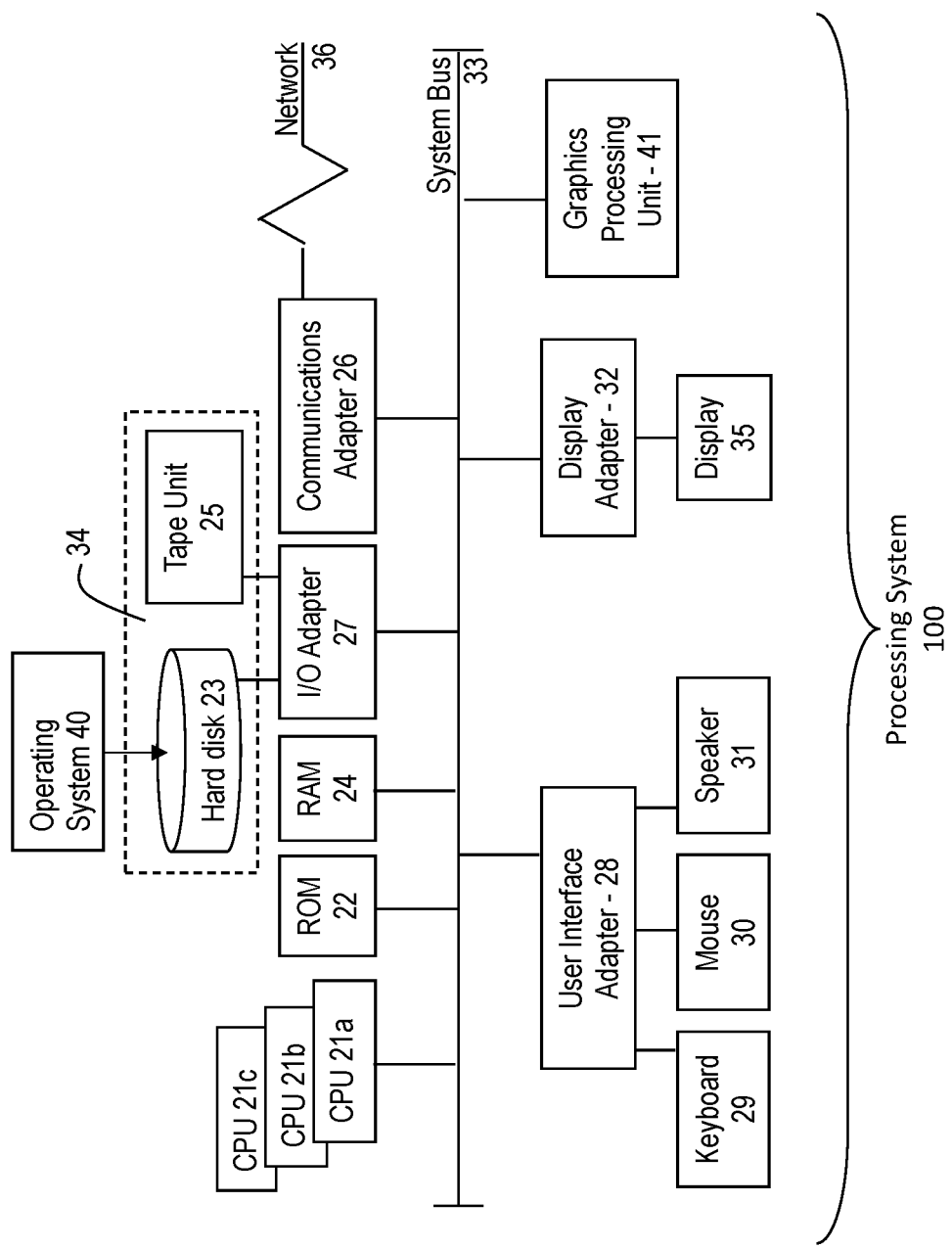
FIG. 1 illustrates a block diagram of a computer system for use in implementing one or more embodiments of the present invention.

FIG. 1 depicts a processing system for implementing one or more embodiments of the present invention. It is understood that one or more embodiments of the present invention are capable of being implemented in conjunction with any other type of computing environment now known or later developed. For example, FIG. 1 depicts a block diagram of a processing system 100 for implementing the techniques described herein. In the embodiment shown in FIG. 1, processing system 100 has one or more central processing units (processors) 21a, 21b, 21c, etc. (collectively or generically referred to as processor(s) 21 and/or as processing device(s)). According to one or more embodiments of the present invention, each processor 21 can include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and can include a basic input/output system (BIOS), which controls certain basic functions of processing system 100.

Further illustrated are an input/output (I/O) adapter 27 and a communications adapter 26 coupled to system bus 33. I/O adapter 27 can be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 100 can be stored in mass storage 34. The RAM 24, ROM 22, and mass storage 34 are examples of memory of the processing system 100. A communications adapter 26 interconnects system bus 33 with an outside network 36 enabling the processing system 100 to communicate with other such systems.

A display (e.g., a display monitor) 35 is connected to system bus 33 by display adaptor 32, which can include a graphics adapter to improve the performance of graphics intensive applications and a video controller. According to one or more embodiments of the present invention, adapters 26, 27, and/or 32 can be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 can be interconnected to system bus 33 via user interface adapter 28, which can include, for example, a Super I/O chip integrating multiple device adapters into a single integrated circuit.

According to one or more embodiments of the present invention, processing system 100 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured herein, processing system 100 includes processing capability in the form of processors 21, storage capability including system memory (e.g., RAM 24), and mass storage 34, input means such as keyboard 29 and mouse 30, and output capability including speaker 31 and display 35. According to one or more embodiments of the present invention, a portion of system memory (e.g., RAM 24) and mass storage 34 collectively store an operating system such as the AIX® operating system from IBM Corporation to coordinate the functions of the various components shown in processing system 100.

Figure 2:
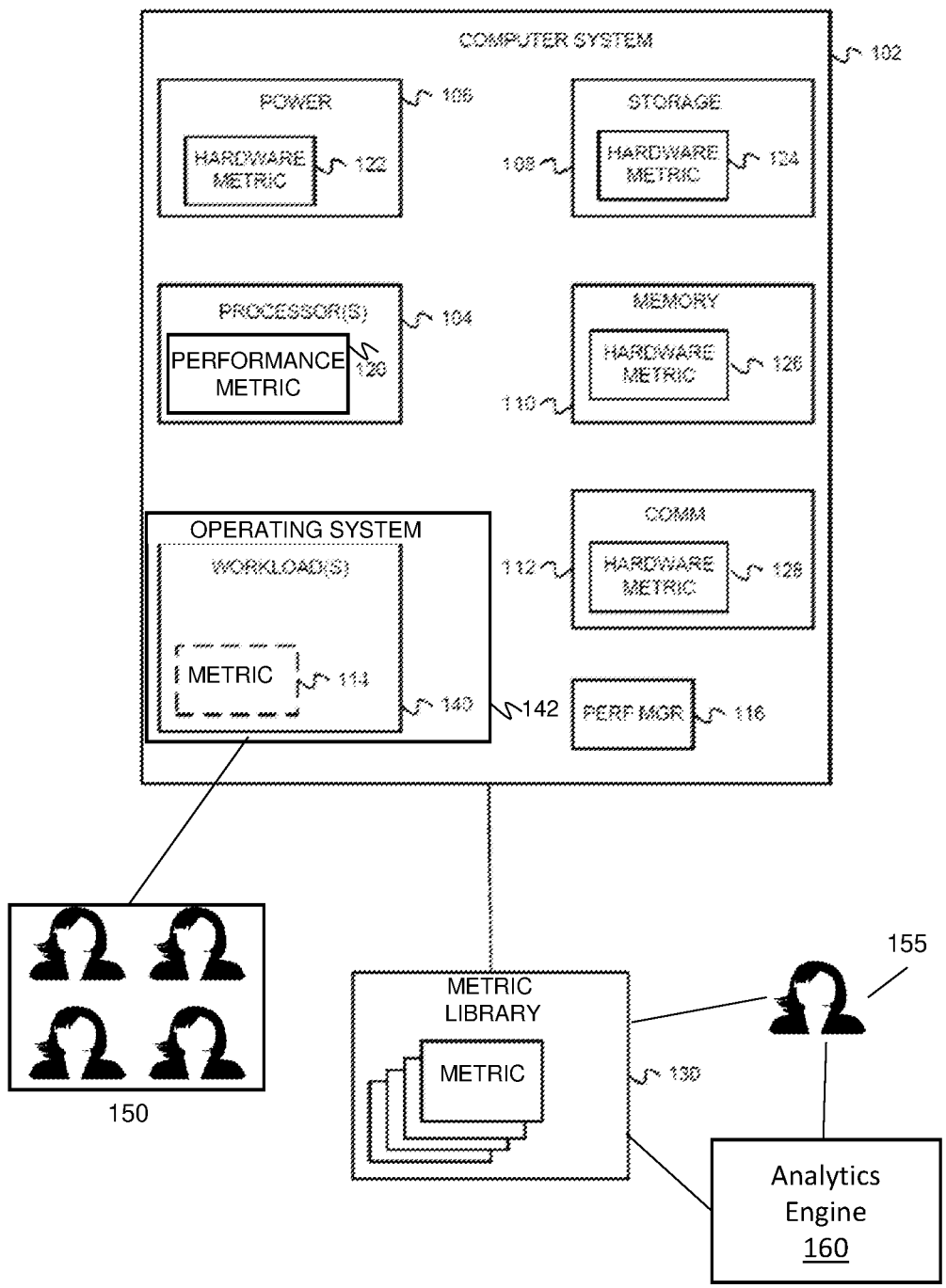
FIG. 2 depicts a block diagram of a system that collects resource and activity metrics according to one or more embodiments of the present invention.

Referring now to FIG. 2, a block diagram of a system that collects performance metrics according to one or more embodiments of the present invention is shown. In some embodiments, system includes a computer system 102, performance manager 116, and metric library 130. Computer system 102 may include processors 104, memory 110, and power subsystem 106, among other components. Computer system 102 may optionally include storage subsystem 108 and communication subsystem 112. The computer system 102 can run multiple operating systems 142 (e.g. z/OS) that run multiple workloads 140 (e.g. On-Line Transaction Processing [OLTP] and batch) to satisfy requests from multiple users 150. In some operating systems (e.g. z/OS), a user instance (150) is embodied in a job (e.g. a work unit for the operating system to complete).

Processors 104 may include one or more processors, including processors with multiple cores, multiple nodes, and/or processors that implement multi-threading. In some embodiments, processors 104 may include simultaneous multi-threaded processor cores. Processors 104 may maintain performance metrics 120 that may include various types of data that indicate or can be used to indicate various performance aspects of processors 104. Performance metrics 120 may include counters for various events that take place on the processors or on individual processor cores on a processor. For example, a processor may have architected registers that maintain counts of instructions, floating point operations, integer operations, on-processor cache hits and misses, pipeline stalls, bus delays, etc. Additionally, time may be a performance metric. Registers or other data locations or functions that maintain a time value may be used as a performance metric 120 in some embodiments.

Memory 110 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.). A memory controller for memory 110 may maintain performance metrics 126 that may include various types of data that indicate or can be used to derive indicators of memory performance. For example, memory performance metrics 126 may include a counter for the number of memory accesses, type of accesses (e.g., read or write access), cache hits, cache misses, etc.

Power subsystem 106 provides and regulates the power to the various components of computer system 102. Power subsystem 106 may maintain performance metrics 122 that comprise voltage levels for various rails of one or more power supplies in power subsystem 106.

Storage subsystem 108, when present, provides persistent storage for computer system 102. Such storage can include hard disks, optical storage devices, magnetic storage devices, solid state drives, or any suitable combination of the foregoing. Storage subsystem 108 may maintain performance metrics 124 that may include counts of read or write accesses, or timing information related to reads, writes and seeks.

Communication subsystem 112, when present, provides network communication functions for computer system 102. Communication subsystem 112 may maintain performance metrics 128 that may include counts of packets transmitted and received and other data regarding network communications. In some embodiments, communication subsystem 112 may include a network interface (e.g., an ATM interface, an Ethernet interface, a Frame Relay interface, SONET interface, wireless interface, etc.)

The computer system 102 contains operating systems (142) that can be configured to process workloads 140. A workload 140 is a set of tasks interacting to complete requests from users 150. An operating system 142 maintains performance metrics 114 for each user about its communication activity (e.g. data size) and resource use (e.g. time using network adapter to send/receive packets from communication subsystem 112). In some embodiments, a performance manager 116 facilitates tracking performance metrics (e.g. read and write accesses from memory subsystem 126) and updating workload and user metrics. Different workloads may have different characteristics. For example, OLTP (On-Line Transaction Processing) workloads typically involve many data entry or retrieval requests that involve many short database interactions. Data mining workloads on the other hand have few interactions with users, but more complicated and lengthy database interactions. Different types of workloads 140 may have different impacts on the activities and resources of computer system 102.

The metric library 130 represents the collection of metrics 120, 122, 124, 126, 128 that the performance manager 116 produced across all aspects of the computer system 102. The metric library 130 may be part of computer system 102, or it may be maintained on a separate system that is available to the computer system 102.

In some embodiments, the metrics aggregated and captured are customized for a particular hardware implementation and/or for particular type of workload 140. For example, for a particular workload 140, the metrics that are aggregated and captured only includes hardware metrics 120 for the used family of processors and memory subsystems.

The analytics engine 160 is in communication with the metric library 130 and the computer system 102. In exemplary embodiments, the analytics engine 160 may reside on the computer system 102 or a separate processing system, such as the processing system 100 described hereinabove and illustrated in FIG. 1, or in some other type of computing or processing environment. The analytics engine 160 obtains metrics from the metric library 130 and establishes base measurement activities as training data. Upon detecting an abnormal operating condition of the computer system 102, the analytics engine obtains performance metrics, anomalous measurement activity, from the performance manager 116. In exemplary embodiments, the analytics engine 160 is configured to allow the performance analyst 155 to quickly identify the significant performance metrics and investigate the causes of the anomalous behavior without wasting time and resources investigating insignificant performance metrics.

Figure 3:
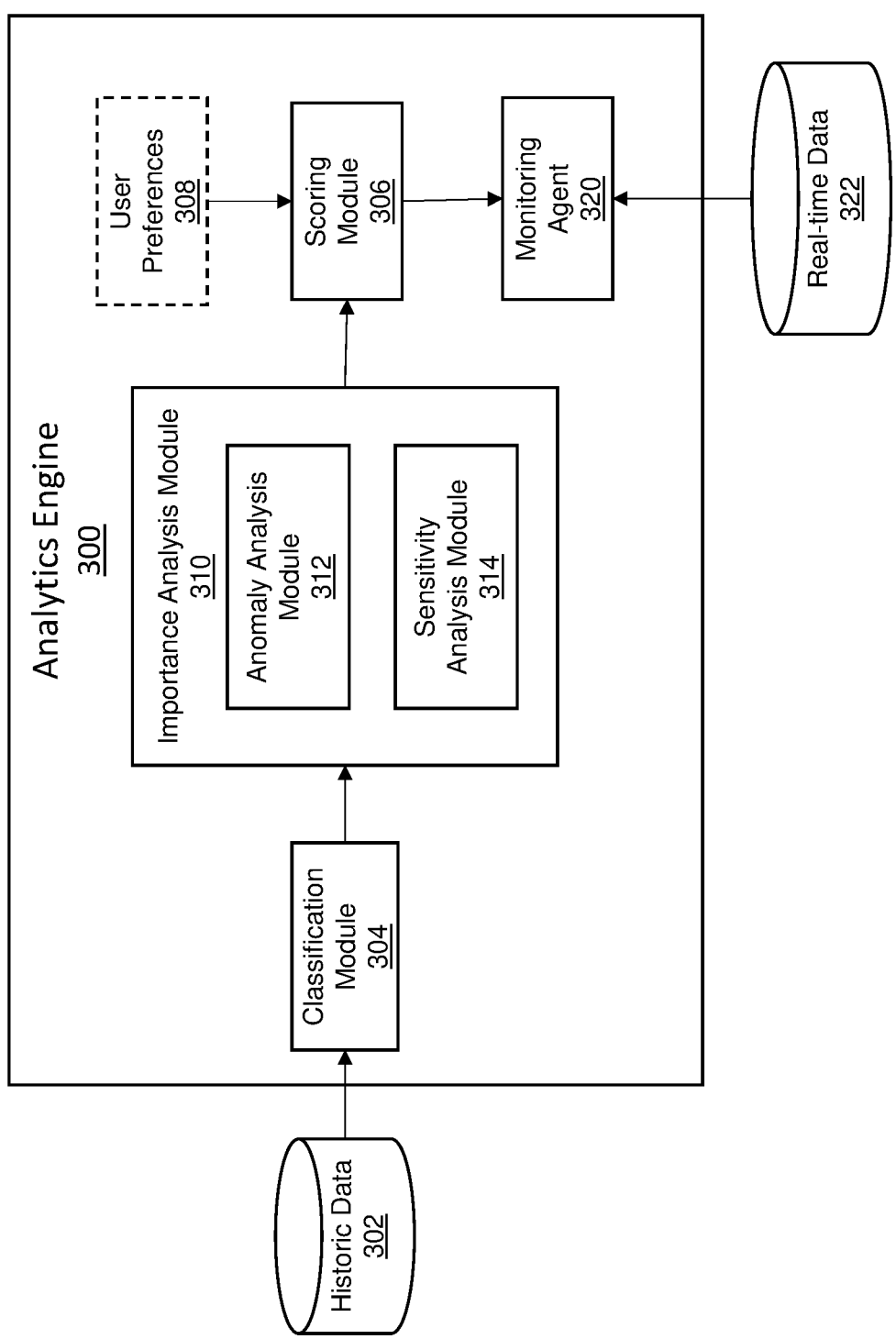
FIG. 3 depicts a block diagram of a system for the cognitive control of runtime resource monitoring scope according to one or more embodiments of the present invention.

Referring now to FIG. 3 a block diagram of a system for the cognitive control of runtime resource monitoring scope according to one or more embodiments of the present invention is shown. In exemplary embodiments, the system includes an analytics engine 300, similar to the one described with reference to FIG. 2, that is configured to receive historic data 302 and real-time data 322 regarding the operation of a computing system. The analytics engine 300 includes a classification module 304, an importance analysis module 310, a scoring module 306 and a monitoring agent 320. In exemplary embodiments, the importance analysis module 310 includes an anomaly analysis module 312 and a sensitivity analysis module 314.

Figure 4:
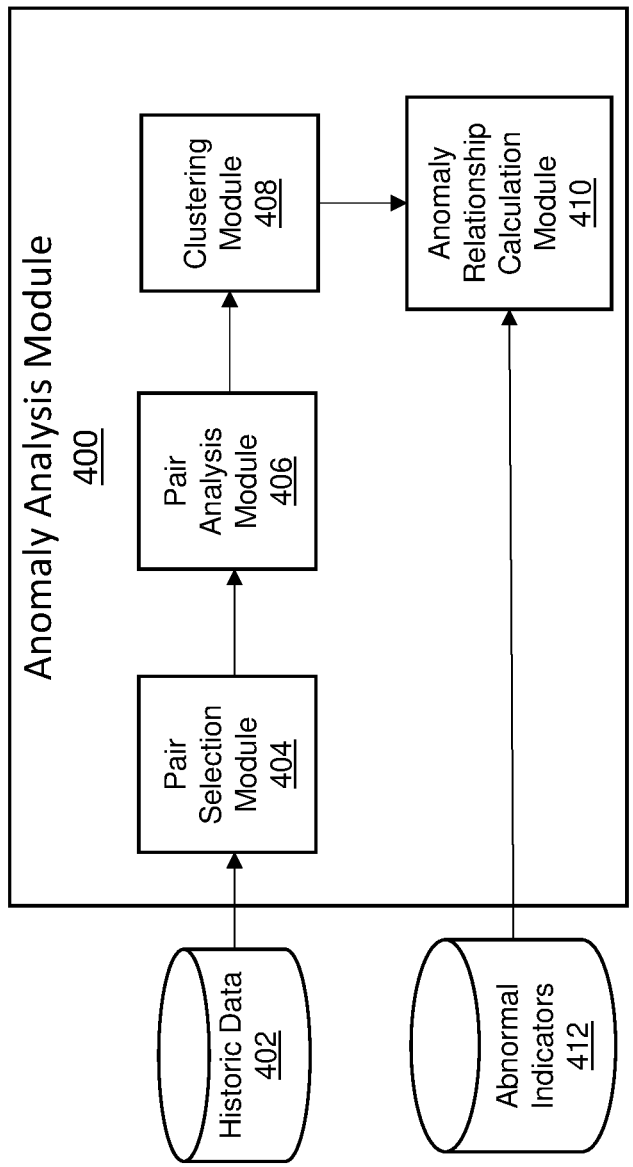
FIG. 4 depicts a block diagram of an anomaly analysis module according to one or more embodiments of the present invention.
Figure 5:
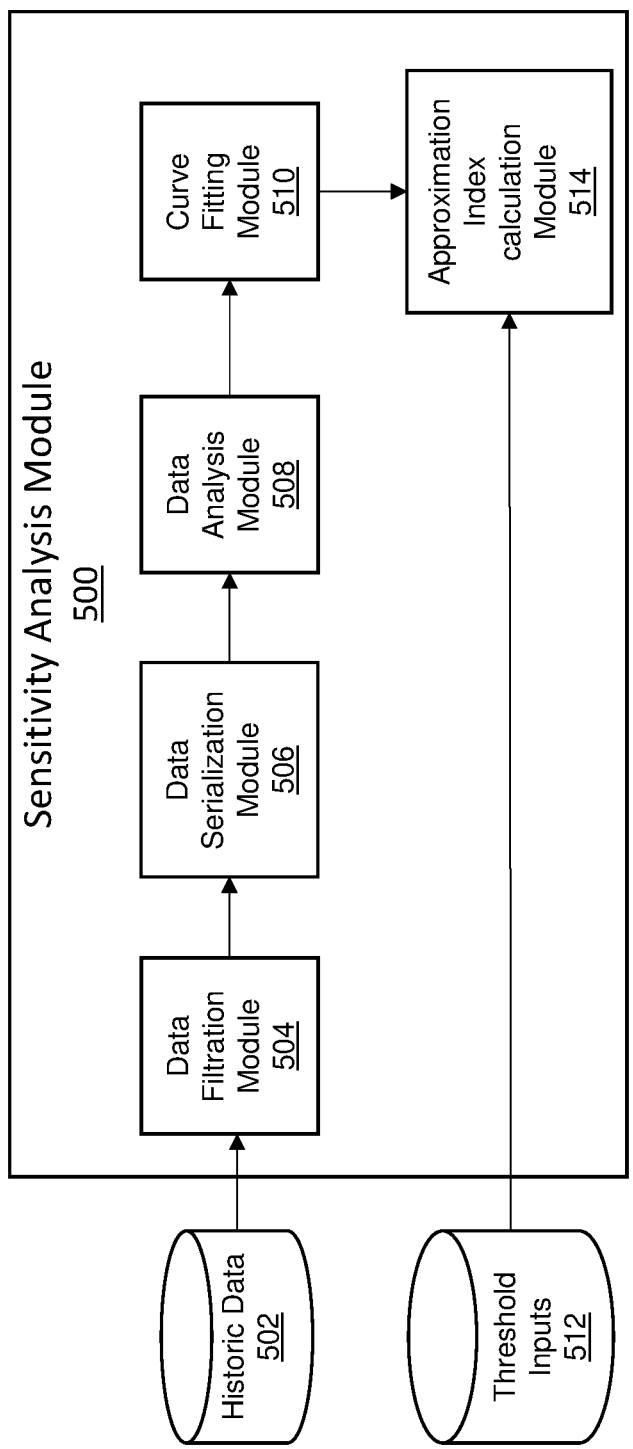
FIG. 5 depicts a block diagram of a sensitivity analysis module according to one or more embodiments of the present invention.

The classification module 304 is configured to receive historic data 302 regarding the operation of a computer system. The historic data 302 includes a plurality of metrics, also referred to as indicators, and each of the plurality of metrics has a plurality of data values along with a transaction rate at the time the data value was captured. The classification module 304 is further configured to serialize the historical data according to the customer defined periods of different transaction rates and system status. The importance analysis module 310, which is discussed in more detail with reference to FIG. 4, is configured to identify the relationship among the plurality of indicator and to calculate an anomaly relationship score for each indicator. The anomaly analysis module 312, which is discussed in more detail with reference to FIG. 5, is configured to calculate a change rate for each indicator as a function of the transaction rate. The anomaly analysis module 312 is further configured to calculate a sensitivity score for each indicator as a function of the transaction rate.

In exemplary embodiments, the scoring module 306 is configured to calculate a priority score for each indicator based on a weighted average of the anomaly relationship score and the sensitivity score. In exemplary embodiments, the weights applied to the anomaly relationship score and the sensitivity score are received as user preferences 308. In one embodiment, both the anomaly relationship score and the sensitivity score have a value between zero and one and the sum of the anomaly relationship score and the sensitivity score is equal to two. In such an embodiment, the user may control the value of the anomaly relationship score and the sensitivity score by controlling a position of an icon on a sliding bar that ranges from an anomaly relationship score of two at one end and zero at the other end with the sensitivity score having the opposite configuration.

In exemplary embodiments, after the priority score for each indicator has been determined the monitoring agent 320 receives real-time data 322 regarding the operation of the computer system. The monitoring agent 320 presents a subset of the real-time data to a user. The subset is created by selecting one or more of the plurality of metrics based on the priority score of each of the plurality of metrics. In one embodiment, the one or more of the plurality of metrics is determined based upon a user provided threshold value. For example, the user may wish to only view real-time data associated with the metrics that have the top ten priority score. In another example, the user wishes to view real-time data associated with all metrics that have a priority score above a set value.

FIG. 4 depicts a block diagram of an anomaly analysis module 400 according to one or more embodiments of the present invention. The anomaly analysis module 400 includes a pair selection module 404, a pair analysis module 406, a clustering module 408 and an anomaly relationship calculation module 410. In exemplary embodiments, the pair selection module 404 receives historic data 402 and forms the pair of indicators, or performance metrics, for every possible pair of indicators. Next, the pair analysis module 406 receives the pairs of indicators and analyzes distribution statistics for each indicator to determine a distribution function p(x), which includes the one for single indicator p x and for pair p(x, y). The pair analysis module 406 further calculates a Pointwise Mutual Information (PMI) calculation as:

$$PMI(x; y) = \log_2 + \frac{p(x, y)}{p(x)p(y)}$$

In exemplary embodiment, a large PMI(x, y) indicates a close relationship between the pair of indicators, i.e., the indicators have a positive correlation. In exemplary embodiments, the clustering module 408 is configured to cluster the PMI values based on a transaction rate of the computing system. The anomaly relationship calculation module 410 receives one or more abnormal indicators 412 from a user. The abnormal indicators 412 are a set of known indicators that the user has identified are indicated of an abnormal condition in the computing system. The anomaly relationship calculation module 410 is configured to calculate an anomaly relationship score (l) for an indicator (x) with the set of abnormal indicators (y) as:

$$l = \sum_{i=1}^{n} PMI(x; y_i)$$

In exemplary embodiments, the anomaly relationship score l(x) represents the importance of the indicator (x) for the problem associated with the set of abnormal indicators (y). As a result, the anomaly relationship score l(x) is often used to identify or investigate the root cause of an abnormal condition.

FIG. 5 depicts a block diagram of a sensitivity analysis module 500 according to one or more embodiments of the present invention. The sensitivity analysis module 500 includes a data filtration module 504, a data serialization module 506, a data analysis module 508, a curve fitting module 510 and an approximation index calculation module 514. The data filtration module 504 is configured to receive historic data 502 regarding the operation of a computing system and to filter out abnormal data from the data set. In exemplary embodiments, such filtration is done using well known statistical analysis techniques. Next, after the data has been fileted, the data serialization module 506 is configured to serialize the data as a pair of data value and transaction rate at the time the data value was captured. The data analysis module 508 receives the serialized data and analyses the data to determine a shape of the distribution of the data. Based on the shape of the distribution of the data, the curve fitting module 510 identifies a curvature function E(r) that describes the value change of indicator as a function of the transaction rate (r). The approximation index calculation module 514 receives the curvature function E(r) and a threshold input T 512 for an indicator. The threshold input 512 is received from a user and indicates a delineation between normal and abnormal readings for the indicator. The threshold input 512 may be provided as a fixed value or as a function of the transaction rate (r). The approximation index calculation module 514 calculates a sensitivity score (a) as:

$$a = \frac{T}{E(r)}$$

The sensitivity score (a) represents the sensitivity of the indicator to the transaction rate. As a result, the anomaly sensitivity score (a) is often used to predict a potential abnormal condition based on the transaction rate.

Once the relationship score l(x) and anomaly sensitivity score (a) has been calculated, during operation of the computing system every indicator will have anomaly sensitivity score (a) and a relationship score l(x) identified based on the top abnormal or potential abnormal indicators. In one embodiment, the relationship score l(x) and the anomaly sensitivity score (a) are normalization as L(r) and A(r), respectively. A combined score, or priority score, for each indicator, is calculated with as: P=αL(r)+βA(r), where α and β are the weight parameters provided by a user.

Figure 6:
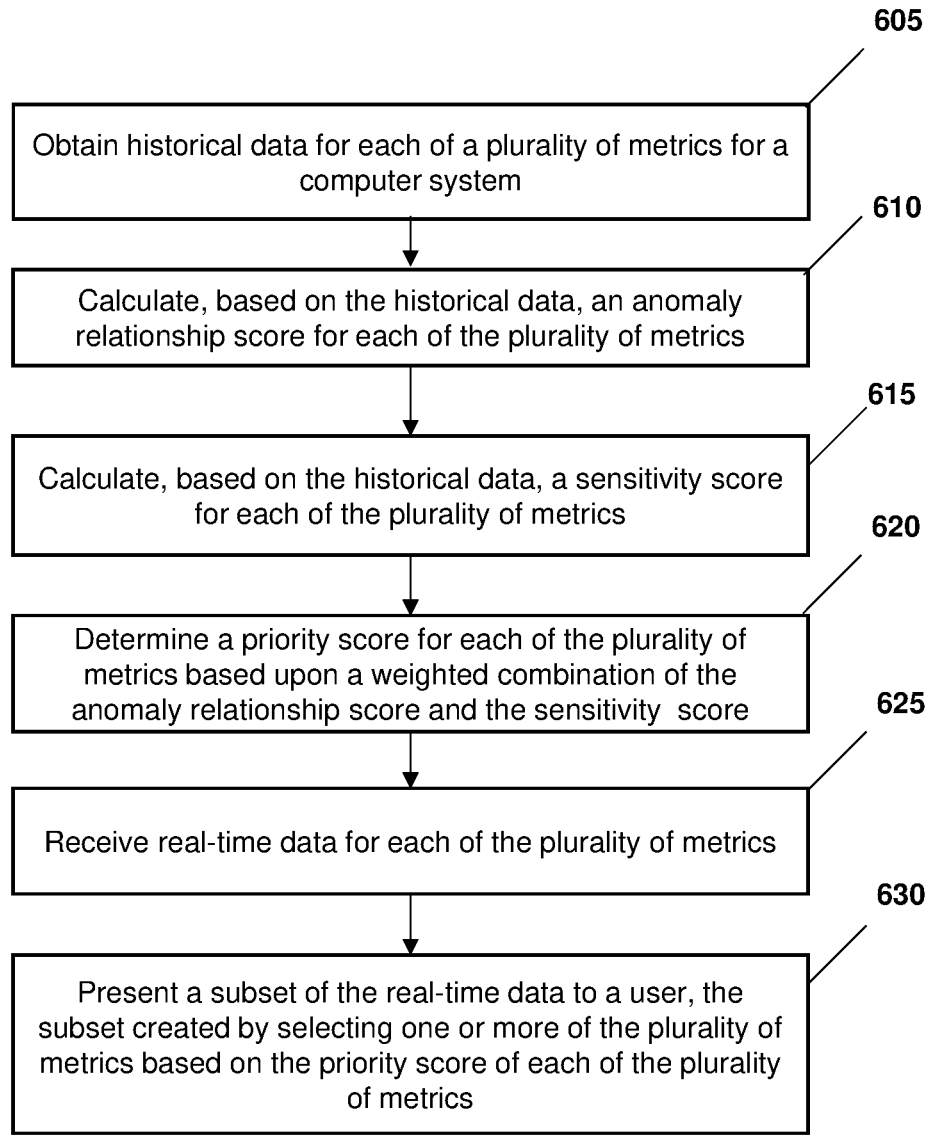
FIG. 6 depicts a flowchart of a method for the cognitive control of runtime resource monitoring scope according to one or more embodiments of the present invention.

FIG. 6 depicts a flowchart for the method for the cognitive control of runtime resource monitoring scope according to one or more embodiments of the present invention. As illustrated, the method begins at block 605 by obtaining historical data for each of a plurality of metrics for a computer system. Next, as shown at block 610, the method includes calculating, based on the historical data, an anomaly relationship score for each of the plurality of metrics. The anomaly relationship score for each of the plurality of metrics represents the importance of the metric for problem analysis, also referred to as root cause analysis. In exemplary embodiments, the anomaly relationship score for an metric, or indicator, is calculated such that the anomaly relationship score will be positively correlated with the strength of a relationship to a known abnormal indicator.

Next, as shown at block 615, the method includes calculating, based on the historical data, a sensitivity score for each of the plurality of metrics. The sensitivity score for each of the plurality of metrics represents the sensitivity of the metric, or indicator, to a transaction rate of the computer system. In exemplary embodiments, the sensitivity score is configured to identify which metrics are sensitive based on the current transaction rate and therefore which metrics should be more closely monitored to predict, or detect, errors in the computer system. The method also includes determining a priority score for each of the plurality of metrics based upon a weighted combination of the anomaly relationship score and the sensitivity score, as shown at block 620. In exemplary embodiments, the priority score is determined to be the sum of the anomaly relationship score multiplied by a root cause analysis factor and the sensitivity score multiplied by an error prediction factor. In one embodiment, the root cause analysis factor and the error prediction factor are provided by the user and have a value between zero and one and wherein the sum of the root cause analysis factor and the error prediction factor is two.

Once the priority score for each of the plurality of metrics has been determined, the method includes receiving real-time data for each of the plurality of metrics, as shown at block 625. Next, as shown at block 630, the method includes presenting a subset of the real-time data to a user, the subset created by selecting one or more of the plurality of metrics based on the priority score of each of the plurality of metrics. In exemplary embodiment, the one or more of the plurality of metrics based on the priority score of each of the plurality of metrics are also selected based upon a current transaction rate.

In one embodiment, the calculating the anomaly relationship score for each of the plurality of metrics includes calculating a distribution function for each of the plurality of metrics, calculating a pair distribution function each possible combination of two of the plurality of metrics, and calculating a pointwise mutual information value for each possible combination of two of the plurality of metrics. The anomaly relationship score is determined for a selected metric of the plurality of metrics by summing the pointwise mutual information value for each of the possible combination of two of the plurality of metrics that includes the selected metric.

In one embodiment, calculating the sensitivity score for each of the plurality of metrics includes serializing the historical data for a selected metric of the plurality of metrics to create data pairs that each include a data value and a transaction rate at the time the data value was captured and performing a statistical analysis on the data pairs to identify an approximation function for the data value as a function of the transaction rate. The sensitivity score for each of the plurality of metrics is based at least in part on an abnormal threshold that is obtained from the user and a current transaction rate of the computer system. The sensitivity score for the selected metric is determined by dividing the abnormal threshold by a value of the approximation function for the current transaction rate. In one embodiment, the abnormal threshold is a function of the transaction rate.

The present invention are rooted in computing technology, particularly defining a workload performance problem in a computing system where a consumed resource to consumer combination is a significant contributor to the problem. One or more embodiments of the present invention further improve existing solutions in this regard by improving performance and by reducing CPU cost (CPU usage), amount of data instrumented, stored, and further analyzed. In turn, the workload performance problem can be diagnosed faster compared to existing solutions.

One or more embodiments of the present invention provide such advantages through cognitive control of runtime resource monitoring scope. As a result, a performance analyst can quickly identify the significant performance metrics and investigate the causes of the anomalous behavior without wasting time and resources investigating insignificant performance metrics. In this manner, the performance analyst receives the right data to discover consumed resource to consumer relationships and at significantly lower costs to CPU, memory, and disk.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for cognitive control of runtime resource monitoring scope, the method comprising:
    obtaining historical data for each of a plurality of metrics for a computer system;
    calculating, based on the historical data, an anomaly relationship score for each of the plurality of metrics;
    calculating, based on the historical data, a sensitivity score for each of the plurality of metrics;
    determining a priority score for each of the plurality of metrics based upon a weighted combination of the anomaly relationship score and the sensitivity score, wherein both the anomaly relationship score and the sensitivity score have a value between zero and one and a sum of the anomaly relationship score and the sensitivity score is equal to two and wherein the weighted combination is determined by a user setting a position of an icon on a sliding bar that ranges from an anomaly relationship score of two at one end and zero at the other end with the sensitivity score having the opposite configuration;

receiving real-time data for each of the plurality of metrics;

creating a subset of the real-time data by selecting one or more of the plurality of metrics based on the priority score of each of the plurality of metrics, wherein the one or more of the plurality of metrics is determined based upon a threshold value provided by a user; and presenting the subset of the real-time data to the user.

2. The computer-implemented method of claim 1, wherein calculating the anomaly relationship score for each of the plurality of metrics comprises:

calculating a distribution function for each of the plurality of metrics;

calculating a pair distribution function for each possible combination of two of the plurality of metrics;

calculating a pointwise mutual information value for each possible combination of two of the plurality of metrics; and determining the anomaly relationship score for a selected metric of the plurality of metrics by summing the pointwise mutual information value for each of the possible combination of two of the plurality of metrics that includes the selected metric.

3. The computer-implemented method of claim 1, wherein calculating the sensitivity score for each of the plurality of metrics comprises:

serializing the historical data for a selected metric of the plurality of metrics to create data pairs that each include a data value and a transaction rate at the time the data value was captured;

performing a statistical analysis on the data pairs to identify an approximation function for the data value as a function of the transaction rate;

obtaining an abnormal threshold from the user and a current transaction rate; and determining the sensitivity score for the selected metric by dividing the abnormal threshold by a value of the approximation function for the current transaction rate.

4. The computer-implemented method of claim 3, wherein the abnormal threshold is a function of the transaction rate.

5. The computer-implemented method of claim 1, wherein the priority score is determined to be the sum of the anomaly relationship score multiplied by a root cause analysis factor and the sensitivity score multiplied by an error prediction factor.

6. The computer-implemented method of claim 5, wherein each of the root cause analysis factor and the error prediction factor are provided by the user.

7. The computer-implemented method of claim 6, wherein each of the root cause analysis factor and the error prediction factor have a value between zero and one and wherein the sum of the root cause analysis factor and the error prediction factor is two.

8. A computer program product comprising a memory device with computer executable instructions therein, the instructions when executed by a processing unit perform a method for cognitive control of runtime resource monitoring scope, the method comprising:

obtaining historical data for each of a plurality of metrics for a computer system;

calculating, based on the historical data, an anomaly relationship score for each of the plurality of metrics;

calculating, based on the historical data, a sensitivity score for each of the plurality of metrics;

determining a priority score for each of the plurality of metrics based upon a weighted combination of the anomaly relationship score and the sensitivity score, wherein both the anomaly relationship score and the sensitivity score have a value between zero and one and a sum of the anomaly relationship score and the sensitivity score is equal to two and wherein the weighted combination is determined by a user setting a position of an icon on a sliding bar that ranges from an anomaly relationship score of two at one end and zero at the other end with the sensitivity score having the opposite configuration;

receiving real-time data for each of the plurality of metrics;

creating a subset of the real-time data by selecting one or more of the plurality of metrics based on the priority score of each of the plurality of metrics, wherein the one or more of the plurality of metrics is determined based upon a threshold value provided by a user; and presenting the subset of the real-time data to the user.

9. The computer program product of claim 8, wherein calculating the anomaly relationship score for each of the plurality of metrics comprises:

calculating a distribution function for each of the plurality of metrics;

calculating a pair distribution function for each possible combination of two of the plurality of metrics;

calculating a pointwise mutual information value for each possible combination of two of the plurality of metrics; and determining the anomaly relationship score for a selected metric of the plurality of metrics by summing the pointwise mutual information value for each of the possible combination of two of the plurality of metrics that includes the selected metric.

10. The computer program product of claim 8, wherein calculating the sensitivity score for each of the plurality of metrics comprises:

serializing the historical data for a selected metric of the plurality of metrics to create data pairs that each include a data value and a transaction rate at the time the data value was captured;

performing a statistical analysis on the data pairs to identify an approximation function for the data value as a function of the transaction rate;

obtaining an abnormal threshold from the user and a current transaction rate; and determining the sensitivity score for the selected metric by dividing the abnormal threshold by a value of the approximation function for the current transaction rate.

11. The computer program product of claim 10, wherein the abnormal threshold is a function of the transaction rate.

12. The computer program product of claim 8, wherein the priority score is determined to be the sum of the anomaly relationship score multiplied by a root cause analysis factor and the sensitivity score multiplied by an error prediction factor.

13. The computer program product of claim 12, wherein each of the root cause analysis factor and the error prediction factor are provided by the user.

14. The computer program product of claim 13, wherein each of the root cause analysis factor and the error prediction factor have a value between zero and one and wherein the sum of the root cause analysis factor and the error prediction factor is two.

15. A system comprising:
a memory; and
a processor coupled to the memory, the processor configured to perform a method of cognitive control of runtime resource monitoring scope, the method comprising:
obtaining historical data for each of a plurality of metrics for a computer system;
calculating, based on the historical data, an anomaly relationship score for each of the plurality of metrics;
calculating, based on the historical data, a sensitivity score for each of the plurality of metrics;
determining a priority score for each of the plurality of metrics based upon a weighted combination of the anomaly relationship score and the sensitivity score, wherein both the anomaly relationship score and the sensitivity score have a value between zero and one and a sum of the anomaly relationship score and the sensitivity score is equal to two and wherein the weighted combination is determined by a user setting a position of an icon on a sliding bar that ranges from an anomaly relationship score of two at one end and zero at the other end with the sensitivity score having the opposite configuration;
receiving real-time data for each of the plurality of metrics;
creating a subset of the real-time data by selecting one or more of the plurality of metrics based on the priority score of each of the plurality of metrics, wherein the one or more of the plurality of metrics is determined based upon a threshold value provided by a user; and
presenting the subset of the real-time data to the user.

16. The system of claim 15, wherein calculating the anomaly relationship score for each of the plurality of metrics comprises:
calculating a distribution function for each of the plurality of metrics;
calculating a pair distribution function for each possible combination of two of the plurality of metrics;
calculating a pointwise mutual information value for each possible combination of two of the plurality of metrics; and
determining the anomaly relationship score for a selected metric of the plurality of metrics by summing the pointwise mutual information value for each of the possible combination of two of the plurality of metrics that includes the selected metric.

17. The system of claim 15, wherein calculating the sensitivity score for each of the plurality of metrics comprises:
serializing the historical data for a selected metric of the plurality of metrics to create data pairs that each include a data value and a transaction rate at the time the data value was captured;
performing a statistical analysis on the data pairs to identify an approximation function for the data value as a function of the transaction rate;
obtaining an abnormal threshold from the user and a current transaction rate; and
determining the sensitivity score for the selected metric by dividing the abnormal threshold by a value of the approximation function for the current transaction rate.

18. The system of claim 17, wherein the abnormal threshold is a function of the transaction rate.

19. The system of claim 15, wherein the priority score is determined to be the sum of the anomaly relationship score multiplied by a root cause analysis factor and the sensitivity score multiplied by an error prediction factor.

20. The system of claim 19, wherein each of the root cause analysis factor and the error prediction factor are provided by the user.

* * * * *